(12) United States Patent
Suzuki

(10) Patent No.: US 11,097,575 B2
(45) Date of Patent: Aug. 24, 2021

(54) PNEUMATIC TIRE

(71) Applicant: The Yokohama Rubber Co., LTD., Tokyo (JP)

(72) Inventor: Takayuki Suzuki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 271 days.

(21) Appl. No.: 16/064,931

(22) PCT Filed: Dec. 22, 2016

(86) PCT No.: PCT/JP2016/088535
§ 371 (c)(1),
(2) Date: Jun. 21, 2018

(87) PCT Pub. No.: WO2017/111113
PCT Pub. Date: Jun. 29, 2017

(65) Prior Publication Data
US 2018/0370296 A1    Dec. 27, 2018

(30) Foreign Application Priority Data
Dec. 25, 2015 (JP) .............................. JP2015-255197

(51) Int. Cl.
*B60C 15/024* (2006.01)
*B60C 15/06* (2006.01)
(Continued)

(52) U.S. Cl.
CPC .......... *B60C 15/0653* (2013.01); *B60C 15/00* (2013.01); *B60C 15/024* (2013.01);
(Continued)

(58) Field of Classification Search
CPC ....... B60C 15/00; B60C 15/024; B60C 15/06; B60C 15/0628; B60C 15/0632
See application file for complete search history.

(56) References Cited

U.S. PATENT DOCUMENTS 4,667,722 A * 5/1987 Klepper .................. B60C 15/06
152/543
4,768,573 A * 9/1988 Poque ..................... B60C 15/02
152/378 R
(Continued)

FOREIGN PATENT DOCUMENTS

CN   101823410   9/2010
JP   01306306   * 12/1989
(Continued)

OTHER PUBLICATIONS

Machine translation of JP 1-306306, 1992.*
International Search Report for International Application No. PCT/JP2016/088535 dated Feb. 14, 2017, 4 pages, Japan.

*Primary Examiner* — Justin R Fischer
(74) *Attorney, Agent, or Firm* — Thorpe North & Western

(57) ABSTRACT

A pneumatic tire includes a bead portions and a bead core at the bead portions, the tire being mounted to a 15°-tapered specified rim. The bead portions include a portion inward in a radial direction of an extension line of an inner circumferential surface of the bead core, the extension line extending in the lateral direction, that is positioned outward in the tire lateral direction of an imaginary line passing through a first intersection point between the extension line and a tire inner surface and extends inward in the tire radial direction from the extension line at an angle perpendicular to the extension line. An angle α formed by the imaginary line and a line segment passing through a second intersection point between a bead base and the tire inner surface and the first intersection point between the extension line and the tire inner surface is from 0° to 25°.

10 Claims, 7 Drawing Sheets

(51) Int. Cl.
*B60C 15/00* (2006.01)
*B60C 15/04* (2006.01)

(52) U.S. Cl.
CPC .......... *B60C 15/0242* (2013.01); *B60C 15/04* (2013.01); *B60C 15/06* (2013.01); *B60C 15/0635* (2013.01); *B60C 2015/046* (2013.01); *B60C 2015/066* (2013.01); *B60C 2015/0614* (2013.01); *B60C 2015/0657* (2013.01); *B60C 2200/06* (2013.01)

(56) References Cited

U.S. PATENT DOCUMENTS

| | | | |
|---|---|---|---|
| 7,615,590 B2* | 11/2009 | Mizuno | B60C 1/00 152/525 |
| 8,002,007 B2* | 8/2011 | Sasaki | B60C 15/024 152/539 |
| 2002/0189739 A1 | 12/2002 | Koya et al. | |
| 2010/0224300 A1 | 9/2010 | Maruoka | |
| 2012/0325391 A1 | 12/2012 | Miyazaki | |

FOREIGN PATENT DOCUMENTS

| | | |
|---|---|---|
| JP | H06-206408 | 7/1994 |
| JP | H09-123714 | 5/1997 |
| JP | 2002-337516 | 11/2002 |
| JP | 2004-511383 | 4/2004 |
| JP | 2007-230515 | 9/2007 |
| JP | 2009-137437 | 6/2009 |
| JP | 2013-028783 | 2/2013 |
| JP | 2015-157583 | 9/2015 |
| WO | WO 2002/32697 | 4/2002 |

* cited by examiner

|  | CONVENTIONAL EXAMPLE | COMPARATIVE EXAMPLE | EXAMPLE 1 | EXAMPLE 2 | EXAMPLE 3 |
|---|---|---|---|---|---|
| α (FROM 0° TO 25°) | -10 | 30 | 0 | 25 | 0 |
| γ (FROM 85° TO 100°) | 80 | 130 | 80 | 105 | 80 |
| COMPLEX ELASTIC MODULUS (MPa) (FROM 3 MPA TO 7 MPA) | 2.5 | 2.5 | 2.5 | 2.5 | 2.5 |
| ELONGATION AT BREAK (%) (FROM 200% TO 350%) | 370 | 370 | 370 | 370 | 370 |
| BEAD TOE DEFORMATION | 100 | 122 | 110 | 120 | 110 |
| REINFLATABILITY | YES | NO | YES | YES | YES |
| BEAD TOE CHIPPING | NO | NO | NO | NO | NO |

FIG. 5A

|  | EXAMPLE 4 | EXAMPLE 5 | EXAMPLE 6 | EXAMPLE 7 | EXAMPLE 8 |
|---|---|---|---|---|---|
| α (FROM 0° TO 25°) | 0 | 10 | 10 | 20 | 10 |
| γ (FROM 85° TO 100°) | 85 | 90 | 100 | 105 | 90 |
| COMPLEX ELASTIC MODULUS (MPa) (FROM 3 MPA TO 7 MPA) | 2.5 | 2.5 | 2.5 | 2.5 | 2.5 |
| ELONGATION AT BREAK (%) (FROM 200% TO 350%) | 370 | 370 | 370 | 370 | 370 |
| BEAD TOE DEFORMATION | 115 | 120 | 122 | 123 | 110 |
| REINFLATABILITY | YES | YES | YES | YES | YES |
| BEAD TOE CHIPPING | NO | NO | NO | NO | NO |

FIG. 5B

|  | EXAMPLE 9 | EXAMPLE 10 | EXAMPLE 11 |
|---|---|---|---|
| α (FROM 0° TO 25°) | 10 | 10 | 10 |
| γ (FROM 85° TO 100°) | 90 | 90 | 90 |
| COMPLEX ELASTIC MODULUS (MPa) (FROM 3 MPA TO 7 MPA) | 3 | 7 | 7.5 |
| ELONGATION AT BREAK (%) (FROM 200% TO 350%) | 350 | 200 | 180 |
| BEAD TOE DEFORMATION | 115 | 120 | 122 |
| REINFLATABILITY | YES | YES | YES |
| BEAD TOE CHIPPING | NO | NO | YES |

FIG. 5C

PNEUMATIC TIRE

TECHNICAL FIELD

The present technology relates to a pneumatic tire.

BACKGROUND ART

In pneumatic tires in the related art, bead portions are provided on both sides in a tire lateral direction, each including a bead core. A rim wheel engages with the bead portions, allowing the pneumatic tire to be mounted to the rim wheel. Additionally, in a heavy duty pneumatic tire used for a truck or a bus, retreading is generally performed to regenerate a tread after the tread wears and reaches the end of a primary service life thereof.

The retreading of a pneumatic tire that has reached a primary service life thereof is performed by retreading the pneumatic tire with the pneumatic tire removed from the rim wheel and then mounting the pneumatic tire to the rim wheel once again, when the pneumatic tire ages and the rubber oxidizes and becomes embrittled, a bead toe serving as a leading edge portion of the bead portion may deform and become damaged when the pneumatic tire is removed from or mounted to the rim wheel. Thus, among the pneumatic tires in the related art, there exist pneumatic tires that suppress damage to the bead toe. For example, according to the pneumatic tire described in Japan Unexamined Patent Publication No. 2004-511383, a pneumatic tire is formed so that a portion of the bead toe of the bead portion is rounded and an included angle of a portion of the bead toe is in a range from 105° to 150°, thereby suppressing deformation of and damage to the bead toe when the pneumatic tire is removed from or mounted to the rim wheel.

However, when a portion of the bead toe is rounded to suppress deformation of the bead toe, the surface area of the portion of the bead portion that engages with the rim wheel decreases, possibly decreasing a hermeticity at the engaging portion. When the hermeticity at the engaging portion between the bead portion and the rim wheel decreases, air leakage readily occurs during reinflation after retreading, making inflation difficult. This makes it very difficult to suppress deformation of the bead toe while ensuring reinflatability after retreading.

SUMMARY

The present technology provides a pneumatic tire capable of suppressing deformation of a bead toe while ensuring reinflatability.

A pneumatic tire according to an embodiment of the present technology includes a pair of bead portions disposed on both sides of a tire equatorial plane in a tire lateral direction, and a bead core provided to each of the pair of bead portions, the pneumatic tire being mounted to a 15°-tapered specified rim. The bead portions include a portion inward in a tire radial direction of an extension line of an inner circumferential surface of the bead core, the extension line extending in the tire lateral direction, the portion is positioned outward in the tire lateral direction of an imaginary line that passes through an intersection point between the extension line and a tire inner surface and extends inward in the tire radial direction from the extension line at an angle perpendicular to the extension line. An angle formed by the imaginary line and a line segment passing through an intersection point between the tire inner surface and an engaging portion that serves as the inner circumferential surface of the bead portion and engages with the specified rim and the intersection point between the extension line and the tire inner surface is from 0° to 25°.

In the pneumatic tire, the bead portions are preferably provided so that an angle formed by the line segment and a straight line that passes through both end portions of the engaging portion in the tire lateral direction is from 85° to 100°.

In the pneumatic tire, the engaging portion preferably includes a rubber layer having a complex elastic modulus from 3 MPa to 7 MPa, and an elongation at break from 200% to 350%.

A pneumatic tire according to an embodiment of the present technology achieves the effect of allowing suppression of deformation of a bead toe while ensuring reinflatability.

BRIEF DESCRIPTION OF DRAWINGS

FIG. 5A is a table showing results of performance tests of pneumatic tires.

FIG. 5B is a table showing results of performance tests of pneumatic tires.

FIG. 5C is a table showing results of performance tests of pneumatic tires.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

Figure 1:
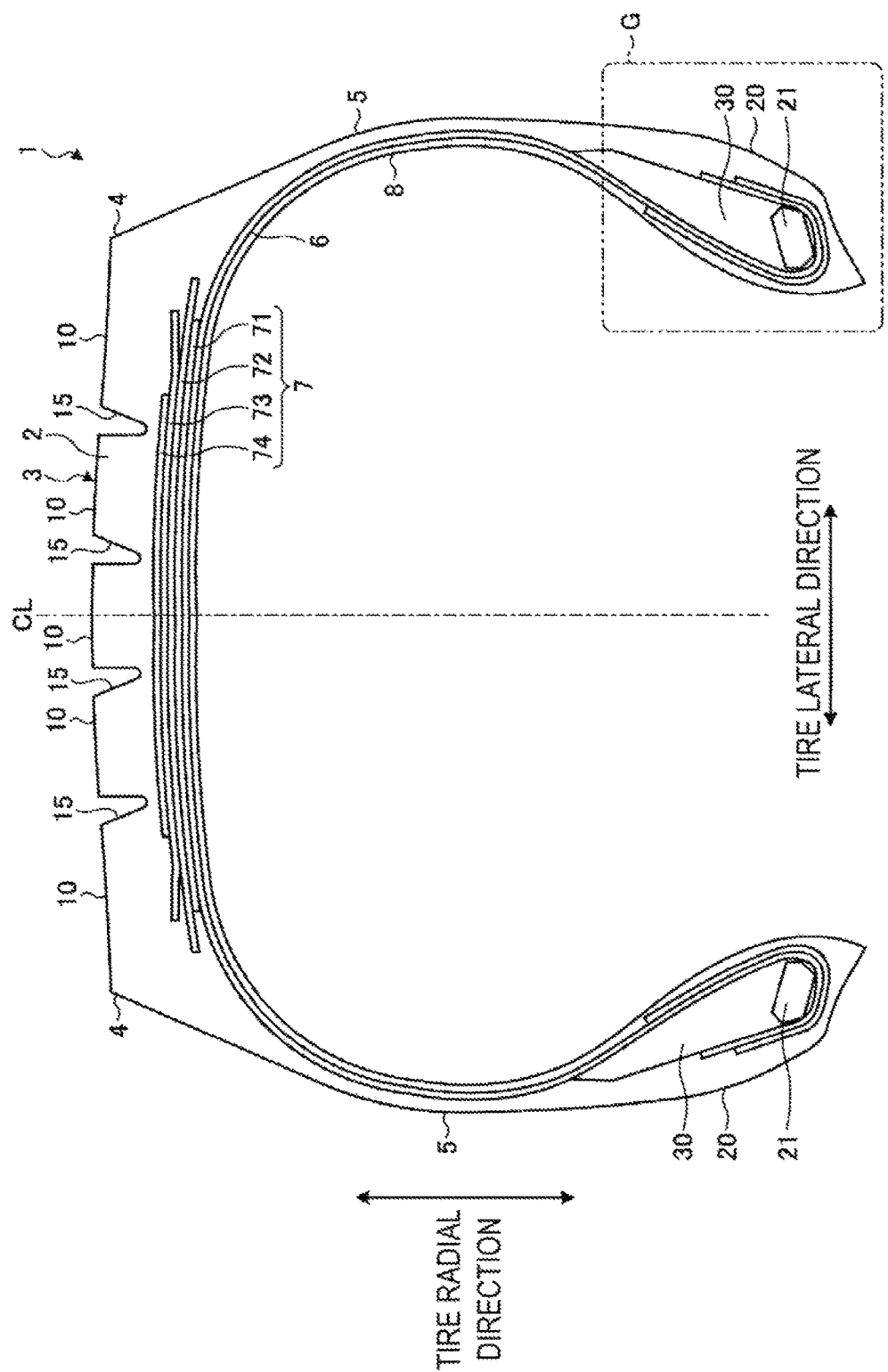
FIG. 1 is a meridian cross-sectional view illustrating a main portion of a pneumatic tire according to an embodiment.

FIG. 1 is a meridian cross-sectional view illustrating a main portion of a pneumatic tire according to an embodiment. A pneumatic tire 1 illustrated in FIG. 1 is provided with a tread portion 2 in an outermost portion in a tire radial direction, as viewed in a meridian cross-section. The surface of the tread portion 2, i.e., the portion that comes into contact with the road surface when a vehicle (not illustrated) mounted with the pneumatic tire 1 travels, is formed as a tread surface 3. A plurality of circumferential main grooves 15 extending in a tire circumferential direction, and a plurality of lug grooves (not illustrated) that intersect the circumferential main grooves 15 are formed on the tread surface 3. A plurality of land portions 10 are defined by the plurality of circumferential main grooves 15 and lug grooves on the tread surface 3. Note that the number of the circumferential main grooves 15, the interval of the lug grooves in the tire circumferential direction, the length and angle of the lug grooves, the groove width and groove depth of each groove, and the like are preferably set as appropriate. That is, a so-called tread pattern formed on the tread surface 3 is preferably set as appropriate.

Both ends of the tread portion 2 in the tire lateral direction are formed as shoulder portions 4, and sidewall portions 5 are provided from the shoulder portions 4 to predetermined positions inward in the tire radial direction. In other words, the sidewall portions 5 are disposed at two positions on either side of the pneumatic tire 1 in the tire lateral direction.

Furthermore, a bead portion 20 is located inward of each sidewall portion 5 in the tire radial direction. The bead portions 20 are disposed at two positions on either side of a tire equatorial plane CL in a similar manner to that of the sidewall portions 5. That is, a pair of the bead portions 20 are provided on both sides of the tire equatorial plane CL in the tire lateral direction. The pair of bead portions 20 are each provided with a bead core 21, and a bead filler 30 is provided outward of the bead core 21 in the tire radial direction. The bead core 21 is formed by winding a bead wire, which is a steel wire, into a ring shape. The bead filler 30 is a rubber material that is disposed in a space defined by an end portion of a carcass 6, described below, in the tire lateral direction, folded back at the position of the bead core 21, outward in the tire lateral direction.

The bead portions 20 are each configured to be capable of being mounted on a 15°-tapered specified rim. Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). That is, the pneumatic tire 1 according to the present embodiment can be mounted on a specified rim in which a portion that engages with the bead portion 20 is inclined at an inclination angle of 15° with respect to a rotation axis.

A belt layer 7 is provided inward of the tread portion 2 in the tire radial direction. The belt layer 7 is, for example, a multilayer structure including four layers of belts 71, 72, 73, 74, and is made by covering a plurality of belt cords made from steel or an organic fiber material, such as polyester, rayon, or nylon, with a coating rubber, and executing a rolling process. Furthermore, the belt cords of the belts 71, 72, 73, 74 differ in the defined inclination angle of a fiber direction of the belt cords with respect to the tire circumferential direction, and the belts are layered so that the fiber directions of the belt cords intersect each other, i.e., a crossply structure.

The carcass 6 is continuously provided inward of the belt layer 7 in the tire radial direction and on the side of the sidewall portions 5 proximal to the tire equatorial plane CL. The carcass 6 includes radial ply cords. The carcass 6 has a single layer structure made of one carcass ply or a multilayer structure made of a plurality of carcass plies, and extends between the bead cores 21 on either side in the tire lateral direction in a toroidal shape, forming the framework of the tire. Specifically, the carcass 6 is disposed from one bead portion 20 of the pair of bead portions 20 to the other bead portion 20 positioned on either side in the tire lateral direction, and turns back outward in the tire lateral direction along the bead cores 21 at the bead portions 20, wrapping around the bead cores 21 and the bead fillers 30. That is, the carcass 6 turns back around the bead cores 21 at the bead portions 20 so as to extend from inward of the bead cores 21 in the tire lateral direction through inward of the bead cores 21 in the tire radial direction to outward of the bead cores 21 in the tire lateral direction. The carcass ply of the carcass 6 thus provided is made by a process of covering a plurality of carcass cords made from steel or an organic fiber material, such as aramid, nylon, polyester, or rayon with a coating rubber and then a rolling process.

Additionally, an innerliner 8 is formed along the carcass 6 on the inner side of the carcass layer 6 or on the interior side of the pneumatic tire 1 of the carcass layer 6.

Figure 2:
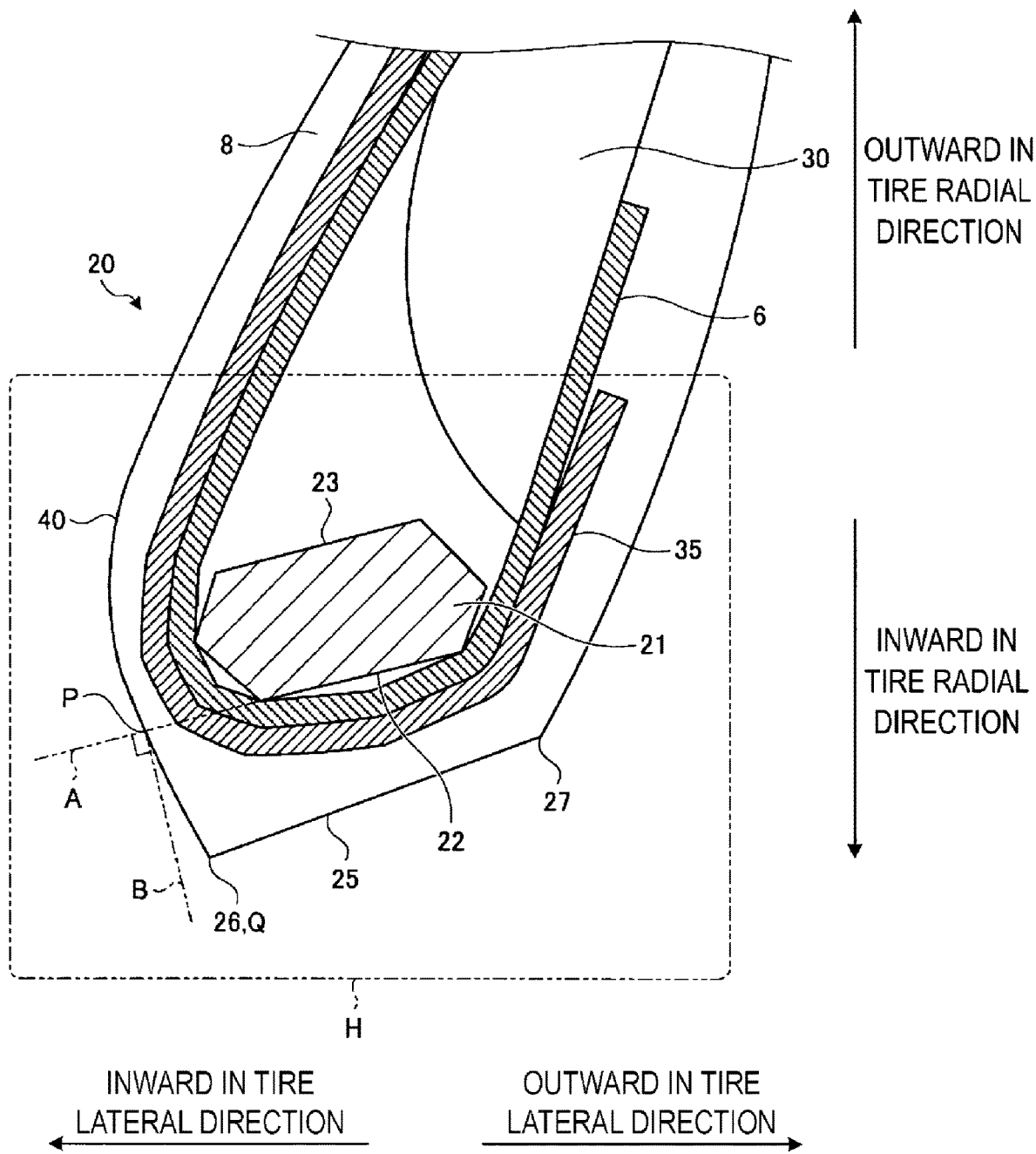
FIG. 2 is a detailed view of area G in FIG. 1.

FIG. 2 is a detailed view of area G of FIG. 1. A carcass reinforcing layer 35 made from steel cord is disposed in the portion of the carcass 6 that turns back around the bead cores 21. The carcass reinforcing layer 35 is disposed layered on the carcass 6 on the outer side of the carcass 6 at the turned back portion of the carcass 6, turns back from the inner side to the outer side in the tire lateral direction around the bead cores 21 in the same way as the carcass 6, and is continuously disposed in the tire circumferential direction. That is, the carcass reinforcing layer 35 is positioned inward of the carcass 6 in the tire lateral direction at the portion where the carcass 6 is positioned inward of the bead cores 21 in the tire lateral direction, is positioned inward of the carcass 6 in the tire radial direction at the portion where the carcass 6 is positioned inward of the bead cores 21 in the tire radial direction, and is positioned outward of the carcass 6 in the tire lateral direction at the portion where the carcass 6 is positioned outward of the bead cores 21 in the tire lateral direction.

Additionally, the bead core 21 formed by winding a bead wire into a ring shape is formed into a substantially hexagonal shape as viewed in a tire meridian cross section. Specifically, the bead core 21 is formed into a substantially hexagonal shape when viewed as a whole with an inner circumferential surface 22 and an outer circumferential surface 23 formed substantially parallel, inclining inward in the tire radial direction from outward to inward in the tire lateral direction, and corner portions that project in the tire lateral direction at positions on both ends in the tire lateral direction.

Note that, when the bead core 21 is viewed in a tire meridian cross section, the inner circumferential surface 22 of the bead core 21 in this case is the surface indicated by an imaginary straight line that, of a plurality of bead wires that are aligned in a row at a position inward of the bead core 21 in the tire radial direction and constitute a surface of the bead core 21, comes into contact with the portion exposed on a surface side of the bead core 21. Similarly, when the bead core 21 is viewed in a tire meridian cross section, the outer circumferential surface 23 of the bead core 21 is the surface indicated by an imaginary straight line that, among the plurality of bead wires that are arranged in a single row at a position outward of the bead core 21 in the tire radial direction and constitute the surface of the bead core 21, comes into contact with the portion exposed on the surface side of the bead core 21.

Further, a bead base 25 which is the surface of the bead portion 20 inward in the tire radial direction, that is, the bead base 25 being the inner circumferential surface of the bead portion 20 inclines inward in the tire radial direction from outward to inward in the tire lateral direction similar to the inner circumferential surface 22 and the outer circumferential surface 23 of the bead core 21. In other words, the bead base 25 inclines in the direction in which a bead toe 26, which is the leading edge portion of the bead base 25 inward in the tire lateral direction, is positioned inward in the tire radial direction of a bead heel 27, which is the end portion of the bead base 25 outward in the tire lateral direction. This bead base 25 is provided as an engaging portion that engages with a specified rim when the pneumatic tire 1 according to the present embodiment is mounted to a specified rim.

Additionally, in the bead portion 20, a tire inner surface 40 is formed curved in a direction projecting inward in the tire lateral direction. In other words, the tire inner surface 40, which is the surface on the inflated side of the pneumatic tire 1, curves in a direction projecting inward in the tire lateral direction at the portion of the bead portion 20. The bead toe 26, which is one end of the bead base 25, serves as an intersection point Q between this tire inner surface 40 and the bead toe 25.

Figure 3:
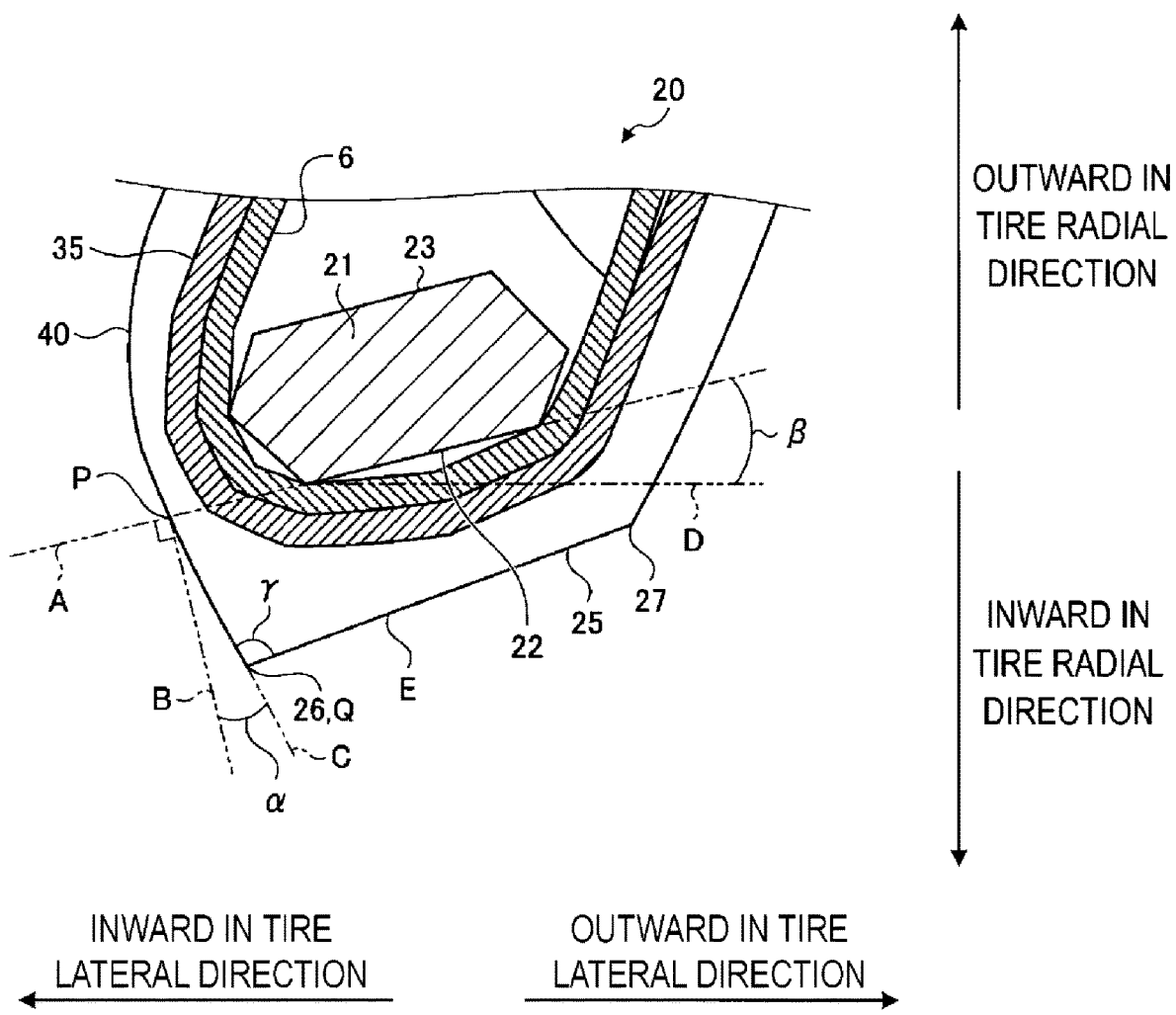
FIG. 3 is a detailed view of area H in FIG. 2.

FIG. 3 is a detailed view of area H of FIG. 2. The portion of the bead portion 20 inward in the tire radial direction of an extension line A of the inner circumferential surface 22 of the bead core 21, the extension line A extending in the tire lateral direction, is positioned outward in the tire lateral direction of an imaginary line B that passes through an intersection point P between the extension line A and the tire inner surface 40 and extends inward in the tire radial direction from the extension line A at an angle perpendicular to the extension line A. Specifically, the extension line A is an imaginary line that extends inward in the tire lateral direction from the inner circumferential surface 22 of the bead core 21 at an inclination angle with respect to the rotation axis of the pneumatic tire 1 that is the same as an inclination angle of the inner circumferential surface 22, and the intersection point P is an intersection point between this extension line A and the tire inner surface 40. Further, the imaginary line B is an imaginary line that is perpendicular to the extension line A at the intersection point P and extends inward in the tire radial direction from the intersection point P. Furthermore, in the bead portion 20, the entire portion inward of the extension line A in the tire radial direction is positioned outward of the imaginary line B in the tire lateral direction.

Note that the bead core 21 is formed by winding a bead wire into a ring shape, and the inner circumferential surface 22 of the bead core 21 is configured by arranging the bead wire in a single row. That is, when the bead core 21 is viewed in a tire meridian cross section, the inner circumferential surface 22 is not linear, but rather configured so that the circles, which are the cross-sectional shapes of the bead wires, are aligned in a row. As a result, the extension line A is set as an imaginary straight line that comes into contact with the portion of the bead wires constituting the inner circumferential surface 22 that is exposed on the front surface side of the bead core 21. Further, the bead wires constituting the inner circumferential surface 22 of the bead core 21 may not be neatly aligned in a row. In such a case, the extension line A is set as an imaginary straight line that comes into contact with the portion of the bead wires equivalent to about half of those constituting the inner circumferential surface 22 that is exposed on the surface side of the bead core 21.

Additionally, the bead core 21 is formed so that an angle β of the extension line A with respect to a straight line D perpendicular to the tire equatorial plane CL is within a range from 13° to 17°. That is, in the bead core 21, the angle of the inner circumferential surface 22 with respect to the rotation axis of the pneumatic tire 1 is within a range from 13° to 17°, and the inner circumferential surface 22 is inclined with respect to the rotation axis in a direction in which a diameter of the inner circumferential surface 22 increases from inward to outward in the tire lateral direction.

Additionally, the bead portion 20 is formed so that an angle α formed by the imaginary line B and a line segment C that passes through the bead toe 26 and the intersection point P, that is, the line segment C passes through the intersection point Q and the intersection point P, is within a range from 0° to 25°. Here, the portion of the tire inner surface 40 near the bead toe 26 in a tire meridian cross-sectional view is formed into a linear shape, and thus the line segment C is generally a straight line along the tire inner surface 40. Note that portion of the tire inner surface 40 near the bead toe 26 does not need to be formed into a linear shape. In this case, regardless of the shape of the tire inner surface 40, the line segment C is a straight line that passes through the intersection point P between the extension line A and the tire inner surface 40 and the intersection point Q between the bead base 25 and the tire inner surface 40. The bead portion 20 is configured so that the angle α formed by the imaginary line B and the line segment C as thus defined is within the range from 0° to 25°.

Additionally, the bead portion 20 is formed so that an angle γ formed by the line segment C and a straight line E that passes through both end portions of the bead base 25 in the tire lateral direction, that is, the line segment E that passes through the bead heel 27 and the bead toe 26 of the bead base 25 is within a range from 85° to 100°. Note that while, in the pneumatic tire 1 according to the present embodiment, the bead base 25 in a tire meridian cross-sectional view is formed into a linear shape and thus the straight line E and the bead base 25 substantially coincide, the bead base 25 may be formed into a shape other than a straight line. The bead base 25 may be, for example, formed to be curved in the middle. In this case, the straight line E may be a straight line that passes through the bead toe 26, which is the leading edge portion inward of the bead base 25 in the tire lateral direction, and the bead heel 27, which is the end portion of the bead base 25 outward in the tire lateral direction, regardless of the shape of the bead base 25. The bead portion 20 is configured so that the angle γ formed by the line segment C and the straight line E as thus defined is within the range from 85° to 100°.

Figure 4:
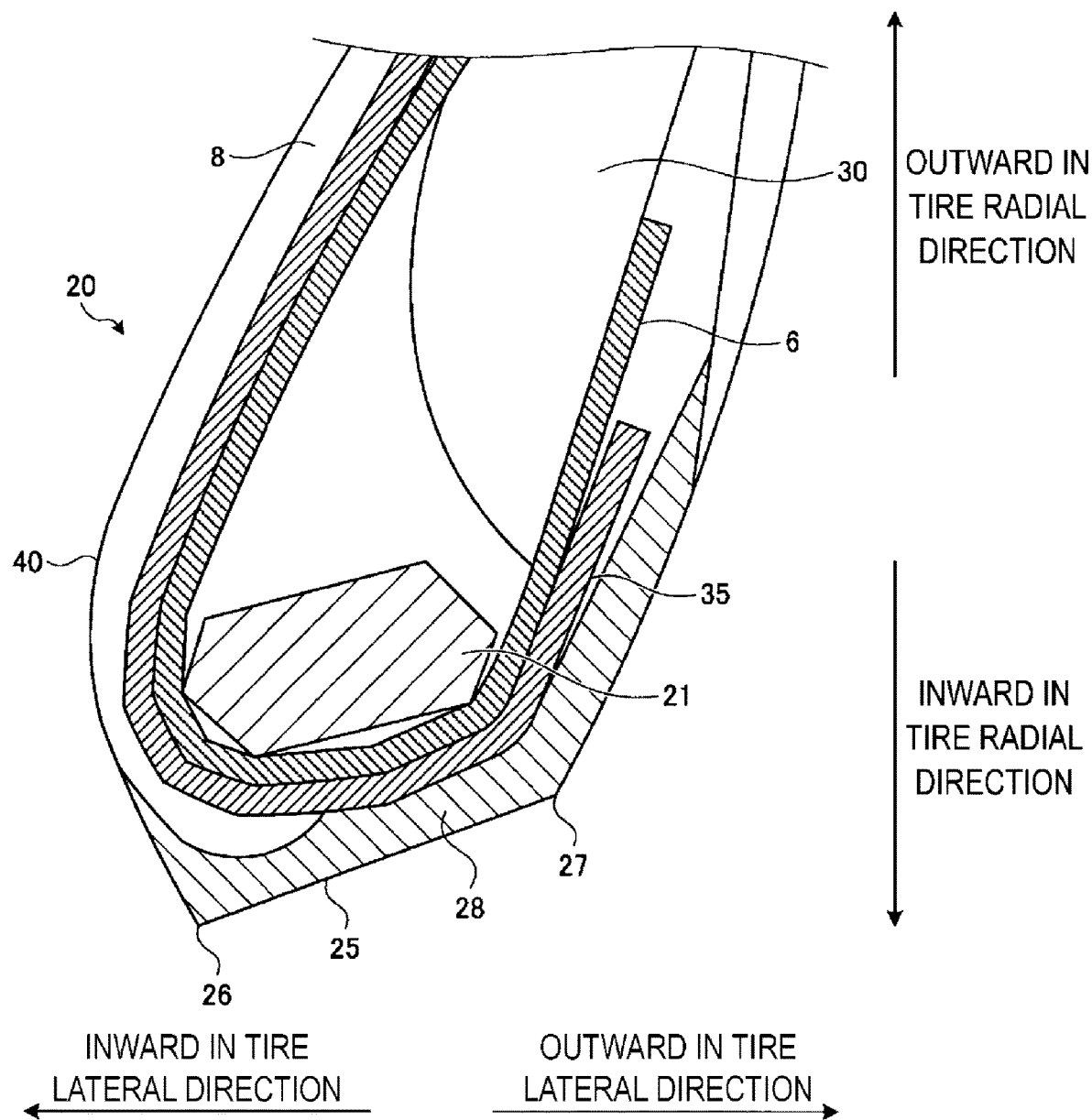
FIG. 4 is an explanatory diagram of a rim cushion rubber.

Note that the relative relationships and angles of these portions are defined after vulcanization molding in the mold, and prior to assembly of the pneumatic tire 1 to the specified rim, without a load applied. Specifically, a distance in the tire lateral direction between the bead heels 27 of each of the bead portions 20 positioned on both sides in the tire lateral direction is defined with the pneumatic tire 1 mounted to the specified rim in an unloaded state. FIG. 4 is an explanatory diagram of a rim cushion rubber. A rim cushion rubber 28 is disposed radially inward and laterally outward of the bead core 21 and the turned back portion of the carcass 6 at the bead portion 20. The rim cushion rubber 28 is the rubber layer constituting a contact surface of the bead portion 20 against the specified rim. The bead base 25 is made from the rim cushion rubber 28. This rim cushion rubber 28 is a rubber layer having a complex elastic modulus from 3 MPa to 7 MPa, and an elongation at break from 200% to 350%. Note that the complex elastic modulus here refers to the value obtained by the measurement method defined in JIS (Japanese Industrial Standard) K7244-4: 1999 (measurement temperature: 60°, initial strain: 10%, amplitude: ±1%, frequency: 10 Hz, deformation mode: tension). Additionally, the elongation at break here is the elongation at break described in JIS K6251:2010.

When the pneumatic tire 1 thus configured is mounted to a vehicle, the pneumatic tire 1 is first mounted by engaging the bead base 25 with the specified rim, and then is inflated. The pneumatic tire 1 is thus mounted to the vehicle while mounted to the rim. The pneumatic tire 1 according to the present embodiment is used as a heavy duty pneumatic tire 1 mounted to a large vehicle such as a truck or a bus, for example.

When a vehicle with the pneumatic tire 1 mounted thereto is driven, the pneumatic tire 1 rotates while the portion of the tread surface 3 positioned at the bottom comes into contact with the road surface. The vehicle is driven by the transmission of a driving force and a braking force to the road surface as well as the generation of a swiveling force by a friction force between the tread surface 3 and the road surface. With the vehicle thus driven by the friction force between the tread surface 3 and the road surface, the tread portion 2 gradually wears in accordance with the distance traveled, reaching a wear threshold when the estimated distance traveled after mounting to the vehicle increases and making it no longer possible to drive the vehicle using the pneumatic tire 1.

According to the heavy duty pneumatic tire 1, when the tread portion 2 is worn, the tread portion 2 is regenerated by retreading. In other words, the tread portion 2 can be regenerated by refurbishing. This retreading is performed with the pneumatic tire 1 removed from the specified rim. Once this retreading is completed, the pneumatic tire 1 is mounted to the rim once again, reinflated, and mounted to the vehicle.

While retreading is thus performed when the tread portion 2 is worn, making it possible to regenerate the tread portion 2, the rubber constituting the pneumatic tire 1 generally deteriorates over time or significant stress continually acts on the bead base 25, which is the engaging portion, when the traveled distance of the vehicle increases, causing the bead toe 26 to rise from the rim and readily deform.

In response, in the pneumatic tire 1 according to the present embodiment, the portion of the bead portion 20 inward of the extension line A in the tire radial direction is positioned outward of the imaginary line B in the tire lateral direction, making it possible to avoid arrangement of rubber in the region where deformation of the bead toe 26 is significant and thus suppress deformation of the bead toe 26. In other words, the portion of the bead portion 20 inward of the extension line A in the tire radial direction is positioned outward of the imaginary line B in the tire lateral direction, making it possible to form the bead toe 26 into a shape that suppresses inward projection in the tire lateral direction. While binding force by the bead core 21 on the bead toe 26 decreases as the amount of inward projection in the tire lateral direction increases, causing a tendency of a rise from the rim and deformation, the bead toe 26 is given a shape that suppresses inward projection in the tire lateral direction, making it possible to avoid arrangement of the rubber in the region where deformation of the bead toe 26 is significant. This arrangement allows for suppression of deformation of the bead toe 26.

Additionally, the angle α formed by the imaginary line B and the line segment C is within the range from 0° to 25°, making it possible to not only suppress deformation of the bead toe 26 but also ensure reinflatability after the tread portion 2 reaches the service life thereof and is retreaded. That is, when the angle α formed by the imaginary line B and the line segment C is less than 0°, suppression of the amount of inward projection of the bead toe 26 in the tire lateral direction becomes difficult, making it difficult to suppress deformation of the bead toe 26. On the other hand, when the angle α formed by the imaginary line B and the line segment C is greater than 25°, the length of the bead base 25 in a tire meridian cross-sectional view, that is, the width of the bead base 25 in the tire lateral direction decreases excessively, possibly causing an excessive decrease in the width of the engaging portion between the bead base 25 and the specified rim. In this case, adhesion of the bead base 25 and the specified rim becomes difficult, possibly causing continuous air leakage from gaps between the bead base 25 and the specified rim during reinflation after retreading and a decrease in reinflatability. In response, in the pneumatic tire 1 according to the present embodiment, the angle α formed by the imaginary line B and the line segment C is within the range from 0° to 25°, making it possible to suppress air leakage during reinflation while suppressing inward projection of the bead toe 26 in the tire lateral direction. This makes it possible to suppress deformation of the bead toe 26 while ensuring reinflatability.

Additionally, the bead portion 20 is formed so that the angle γ formed by the line segment C on the tire inner surface 40 side and the straight line E on the bead base 25 side is within the range from 85° to 100°, making it possible to more reliably suppress deformation of the bead toe 26 as well as provide reinflatability in a compatible manner. That is, when the angle γ formed by the line segment C and the straight line E is less than 85°, both relative angles of the connection portion of the tire inner surface 40 and the bead base 25 are relatively small and may cause the bead toe 26 to readily deform. In other words, when the angle γ formed by the line segment C and the straight line E is less than 85°, it may be difficult to increase the angle of the bead toe 26 in a tire meridian cross-sectional view to the extent that allows suppression of deformation. On the other hand, when the angle γ formed by the line segment C and the straight line E is greater than 100°, the width of the bead base 25 is difficult to maintain, possibly causing difficulties in ensuring reinflatability. In response, in the pneumatic tire 1 according to the present embodiment, the angle γ formed by the line segment C and the straight line E is within the range from 85° to 100°, making it possible to increase the angle of the bead toe 26 at a size that allows reinflatability to be ensured, and thus suppress deformation of the bead toe 26. This makes it possible to more reliably suppress deformation of the bead toe 26 while ensuring reinflatability.

Additionally, the rim cushion rubber 28 is provided as a rubber layer having a complex elastic modulus from 3 MPa to 7 MPa, and an elongation at break from 200% to 350%, making it possible to suppress chipping of the bead toe 26 and ensure cut resistance. That is, when the complex elastic modulus of the rim cushion rubber 28 exceeds 7 MPa, the elongation at break decreases to lower than 200%, possibly causing a decrease in the elasticity of the rim cushion rubber 28. In this case, the flexibility of the bead toe 26 also decreases, possible causing chipping in the bead toe 26 when a large load acts on the bead toe 26 during removal from the specified rim. On the other hand, when the complex elastic modulus of the rim cushion rubber 28 is less than 3 MPa, the strength of the rim cushion rubber 28 decreases, possibly causing cracks to readily be generated when a sharp object comes into contact with the rim cushion rubber 28. In response, in the pneumatic tire 1 according to the present embodiment, the rim cushion rubber 28 has a complex elastic modulus from 3 MPa to 7 MPa, and an elongation at break from 200% to 350%, making it possible to provide both elasticity and strength in a compatible manner at or near the portion that engages with the specified rim. This makes it possible to suppress chipping of the bead toe 26 and ensure cut resistance.

EXAMPLES

FIGS. 5A, 5B and 5C are tables showing results of performance tests of pneumatic tires. In relation to the pneumatic tire 1 described above, performance evaluation tests conducted on pneumatic tires 1 of a Conventional Example and a Comparative Example, and pneumatic tires 1 according to embodiments of the present technology will be described below. The performance evaluation tests were conducted for bead toe deformation, testing the deformation state of the bead toe 6; reinflatability, testing whether reinflation is possible; and bead toe chipping, testing whether chipping occurs in the bead toe 26.

These performance evaluation tests were conducted by mounting the pneumatic tires 1 with a tire size of 11R22.5 to a rim wheel of a specified rim defined by JATMA and a rim size of 2.5×7.50, adjusting the air pressure to a maximum air pressure (700 kPa) defined by JATMA, mounting the tire onto a drive shaft of a 2-D4 (front 2-rear 4 drive) test vehicle, and test-running the tires with the maximum load defined by JATMA applied.

Each test item was evaluated as follows. Bead toe deformation was evaluated by running the tire 100000 km on a test vehicle, measuring the amount of deformation of the bead toe 26, and expressing the measurement result using the Conventional Example as an index value of 100. A higher value indicates less deformation of the bead toe 26 and superior bead toe deformation performance. Additionally, reinflatability was evaluated by mounting the pneumatic tire 1 that was measured for deformation of the bead toe 26 after running 100000 km on the test vehicle, and checking whether inflation is possible using a normal method. Additionally, bead toe chipping was evaluated by visually checking whether chipping occurred in the bead toe 26 when the pneumatic tire 1 is mounted to or removed from the rim wheel after running 100000 km on the test vehicle.

The evaluation test was conducted on 13 pneumatic tires 1, including the pneumatic tire 1 of the Conventional Example, the pneumatic tire 1 of the Comparison Example, and the pneumatic tires 1 of Examples 1 to 11, which are according to the embodiments of the present technology. These pneumatic tires 1 are each configured with the bead portion 20 formed differently. Among these, in the pneumatic tire 1 of the Conventional Example, the angle α formed by the imaginary line B and the line segment C is −10°. That is, in the pneumatic tire 1 of the Conventional Example, the bead toe 26 is positioned inward of the imaginary line B in the tire lateral direction. Additionally, in the pneumatic tire 1 of the Comparative Example, the angle α formed by the imaginary line B and the line segment C is 30°. That is, in the pneumatic tire 1 of the Conventional Example, the bead toe 26 is far away from the imaginary line B, outward in the tire lateral direction, and the width of the bead base 25 is small.

In contrast, in Examples 1 to 11, which are examples of the pneumatic tire 1 according to the embodiments of the present technology, the angles α formed by the imaginary line B and the line segment C are each within the range from 0° to 25° Furthermore, in the pneumatic tires 1 according to the Examples 1 to 11, the angles γ formed by the straight line E and the line segment C each differ, and the complex elastic moduli and elongations at break of the rim cushion rubber 28 each differ.

The evaluation tests conducted using these pneumatic tires 1 show that the pneumatic tires 1 of Examples 1 to 11, unlike that of the Comparative Example, were each inflatable even after the primary service life thereof was reached, making it possible to ensure reinflatability, as illustrated in FIGS. 5A, 5B, and 5C. Additionally, it was found that the pneumatic tires 1 of Examples 1 to 11 are capable of suppressing bead toe deformation in contrast to the pneumatic tire 1 of the Conventional Example. That is, the pneumatic tires 1 according to Examples 1 to 11 are capable of suppressing deformation of the bead toe 26 while ensuring reinflatability.

The invention claimed is:

1. A pneumatic tire comprising:
   a pair of bead portions disposed on both sides of a tire equatorial plane in a tire lateral direction; and
   a bead core provided to each of the pair of bead portions and formed into a hexagonal shape as viewed in a tire meridian cross section;
   the pneumatic tire being mounted to a 15°-tapered specified rim,
   the pair of bead portions comprising a portion inward in a tire radial direction of an extension line of an inner circumferential surface of the hexagonal shape of the bead core, the extension line extending in the tire lateral direction, that is positioned outward in the tire lateral direction of an imaginary line that passes through an intersection point between the extension line and a tire inner surface and extends inward in the tire radial direction from the extension line at an angle perpendicular to the extension line,
   an angle α formed by the imaginary line and a line segment passing through an intersection point between the tire inner surface and an engaging portion that serves as the inner circumferential surface of the pair of bead portions and engages with the specified rim and the intersection point between the extension line and the tire inner surface being from 10° to 25°,
   an angle θ of the extension line with respect to a straight line perpendicular to the tire equatorial plane being 13° to 17°, and
   an innermost vertex in the tire lateral direction of the hexagonal shape of the bead core is positioned inward in the tire lateral direction from an intersection point between the tire inner surface and the engaging portion.

2. The pneumatic tire according to claim 1, wherein the pair of bead portions are provided such that an angle formed by the line segment and a straight line that passes through both end portions of the engaging portion in the tire lateral direction is from 85° to 100°.

3. The pneumatic tire according to claim 2, wherein the engaging portion comprises a rubber layer having a complex elastic modulus from 3 MPa to 7 MPa, and an elongation at break from 200% to 350%.

4. The pneumatic tire according to claim 1, wherein the engaging portion comprises a rubber layer having a complex elastic modulus from 3 MPa to 7 MPa, and an elongation at break from 200% to 350%.

5. The pneumatic tire according to claim 1, wherein the angle α is from 15° to 25°.

6. The pneumatic tire according to claim 1, wherein the angle α is from 20° to 25°.

7. The pneumatic tire according to claim 1, wherein:
   a carcass is turned back outward in the tire lateral direction along the bead core; and a carcass reinforcing layer made from steel cord is disposed layered on an outer side of the carcass at a turned back portion of the carcass.

8. The pneumatic tire according to claim 1, wherein a distance from a straight line passing through a bead toe and a bead heel of one bead portion to the extension line decreases from the bead toe to the bead heel.

9. A pneumatic tire comprising:

a pair of bead portions disposed on both sides of a tire equatorial plane in a tire lateral direction; and a bead core provided to each of the pair of bead portions and formed into a hexagonal shape as viewed in a tire meridian cross section;

the pneumatic tire being mounted to a 15°-tapered specified rim, the pair of bead portions comprising a portion inward in a tire radial direction of an extension line of an inner circumferential surface of the hexagonal shape of the bead core, the extension line extending in the tire lateral direction, that is positioned outward in the tire lateral direction of an imaginary line that passes through an intersection point between the extension line and a tire inner surface and extends inward in the tire radial direction from the extension line at an angle perpendicular to the extension line, an angle $\alpha$ formed by the imaginary line and a line segment passing through an intersection point between the tire inner surface and an engaging portion that serves as the inner circumferential surface of the pair of bead portions and engages with the specified rim and the intersection point between the extension line and the tire inner surface being from 10° to 25°, an angle $\theta$ of the extension line with respect to a straight line perpendicular to the tire equatorial plane being 13° to 17°, a carcass being turned back outward in the tire lateral direction along the bead core, and an axially innermost point in the tire lateral direction of the carcass that is radially inward of a maximum tire section width position being positioned in a region between the extension line of the inner circumferential surface of the hexagonal shape of the bead core and an extension line of the outer circumferential surface of the hexagonal shape of the bead core.

10. The pneumatic tire according to claim 9, wherein an angle formed by a second line segment parallel to the tire lateral direction, intersecting a radially outermost point of the bead core, and a tangent line of the carcass at a second intersection point where the second line segment intersects the carcass is less than 75°.

* * * * *